US012665239B2

(12) United States Patent     (10) Patent No.:   US 12,665,239 B2

MohammadPour et al.     (45) Date of Patent:    Jun. 23, 2026

(54) STRUCTURAL SUPPORT ASSEMBLY INCLUDING AN INFLATABLE MEMBER FOR AN ELECTRIC VEHICLE BATTERY SYSTEM

(71) Applicant: GM Global Technology Operations LLC, Detroit, MI (US)

(72) Inventors: Masoud MohammadPour, Novi, MI (US); Andrew Clay Bobel, Troy, MI (US); William Yu Chen, Troy, MI (US); Qaiser Khan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

(21) Appl. No.: 18/609,341

(22) Filed: Mar. 19, 2024

(65)         Prior Publication Data

US 2025/0300271 A1     Sep. 25, 2025

(51) Int. Cl.
     *H01M 10/6556*      (2014.01)
     *B60L 50/64*      (2019.01)
         (Continued)

(52) U.S. Cl.
     CPC ......... *H01M 10/6556* (2015.04); *B60L 50/64* (2019.02); *H01M 10/613* (2015.04); *H01M 10/625* (2015.04); *H01M 50/209* (2021.01); *H01M 50/242* (2021.01); *H01M 2220/20* (2013.01)

(58) Field of Classification Search
     CPC ........... H01M 10/6556; H01M 10/613; H01M 10/625; H01M 50/209; H01M 50/242; H01M 2220/20; B60L 50/64
     See application file for complete search history.

(56)            References Cited

U.S. PATENT DOCUMENTS 10,189,227 B2    1/2019   Sachdev et al.
11,132,986 B2    9/2021   Sachdev et al.
            (Continued)

FOREIGN PATENT DOCUMENTS

CN       215578744 U   *   1/2022
DE    102019126708 B4     7/2021
            (Continued)

OTHER PUBLICATIONS

German Application No. 10 2024 113 682.0 filed May 16, 2024; German Office Action dated Nov. 22, 2024; 5 pages.

*Primary Examiner* — Edwin A Young

(74) *Attorney, Agent, or Firm* — CANTOR COLBURN LLP

(57)           ABSTRACT

A battery assembly includes a housing having a plurality of side walls that collectively define an interior zone. A plurality of battery cells is arranged in the interior zone. A support assembly connected to the housing supports the plurality of battery cells. The support assembly includes a support plate, an external structural plate, and a channeled cooling plate arranged between the support plate and the external structural plate, and a plurality of channeled cooling plate inflation ports that extend through the support plate towards the channeled cooling plate. The plurality of channeled cooling plate inflation ports introducing an amount of fluid into the support assembly to expand one or more portions of the channeled cooling plate.

20 Claims, 4 Drawing Sheets

(51) Int. Cl.
    *H01M 10/613*      (2014.01)
    *H01M 10/625*      (2014.01)
    *H01M 50/209*      (2021.01)
    *H01M 50/242*      (2021.01)

(56)            References Cited

U.S. PATENT DOCUMENTS

| | | | |
|---|---|---|---|
| 11,437,668 B2 * | 9/2022 | Schmitt | F28F 13/12 |
| 2020/0106145 A1 * | 4/2020 | Schmitt | H01M 10/6556 |
| 2020/0393069 A1 | 12/2020 | Sachdev et al. | |
| 2021/0135307 A1 * | 5/2021 | Bruneau | H01M 50/249 |
| 2022/0093989 A1 | 3/2022 | Quy et al. | |
| 2023/0344032 A1 | 10/2023 | Lipperheide et al. | |

FOREIGN PATENT DOCUMENTS

| | | | |
|---|---|---|---|
| DE | 102020102523 A1 | 8/2021 | |
| WO | 2024134402 A1 | 6/2024 | |

* cited by examiner

STRUCTURAL SUPPORT ASSEMBLY INCLUDING AN INFLATABLE MEMBER FOR AN ELECTRIC VEHICLE BATTERY SYSTEM

INTRODUCTION

The subject disclosure relates to the art of electric vehicles and, more particularly, to a structural support assembly having an inflatable member for an electric vehicle battery assembly.

Many newer vehicles are being manufactured with electric propulsion systems. The electric propulsion system, be it a full electric system or a hybrid electric system, relies on an electric motor that is powered by energy stored in a rechargeable energy storage system (RESS) or battery assembly having a number of battery cells. While in operation, the battery cells generate heat. The heat detracts from battery efficiency. In order to remove heat produced by the battery, many vehicles include a cooling system that circulates a cooling fluid or coolant in thermal contact with the battery cells.

In some cases, the cooling system includes a support plate arranged in a battery housing. Battery cells rest upon the support plate. The coolant passes through conduits arranged below the support plate in a heat exchange relationship with the battery cells. The coolant absorbs heat from the battery cells and is then passed through a heat exchanger before being circulated back through the conduits across the support plate. The support plate is typically large enough to support multiple battery cells, thin enough to provide a good thermal interface, and also robust enough to withstand contacts with road surfaces and debris.

The support plate is typically formed using an extrusion process or a brazing process. Extruded support plates are typically thin and are suitable for smaller form factors. Brazing the support plates limits material selection, takes time, and is expensive. Accordingly, it is desirable to provide a support plate for a battery assembly that is easy and cost effective to manufacture while also being structurally robust enough to protect battery cells while being exposed to road and/or road debris contacts.

SUMMARY

A battery assembly, in accordance with a non-limiting example, includes a housing having a plurality of side walls that collectively define an interior zone. A plurality of battery cells is arranged in the interior zone. A support assembly connected to the housing supports the plurality of battery cells. The support assembly includes a support plate, an external structural plate, and a channeled cooling plate arranged between the support plate and the external structural plate, and a plurality of channeled cooling plate inflation ports that extend through the support plate towards the channeled cooling plate. The plurality of channeled cooling plate inflation ports introducing an amount of fluid into the support assembly to expand one or more portions of the channeled cooling plate.

In addition to one or more of the features described herein a plurality of anchor members connect the channeled cooling plate to the support plate.

In addition to one or more of the features described herein the channeled cooling plate includes one or more selectively expandable inflation zones and one or more fixed zones.

In addition to one or more of the features described herein each of the one or more selectively expandable inflation zones are defined between two of the plurality of anchor members.

In addition to one or more of the features described herein at least one of the one or more selectively expandable inflation zones defines a cooling fluid passage.

In addition to one or more of the features described herein the at least one of the one or more selectively expandable inflation zones defining the cooling fluid passage includes a cooling fluid inlet and a cooling fluid outlet.

In addition to one or more of the features described herein the plurality of channeled cooling plate inflation ports define at least one of the cooling fluid inlet and the cooling fluid outlet.

In addition to one or more of the features described herein a plurality of anchor elements securing the external structural plate to the support plate.

In addition to one or more of the features described herein the external structural plate includes one or more selectively expandable inflation sections.

In addition to one or more of the features described herein a plurality of external structural plate inflation ports extend through the external structural plate towards the channeled cooling plate, the plurality of external structural plate inflation ports introducing an amount of fluid between the external structural plate and the channeled cooling plate to expand one or more portions of the external structural plate.

A vehicle, in accordance with a non-limiting example, includes a body including a passenger compartment, a plurality of wheels, an electric drive unit supported by the body and operatively connected to one or more of the plurality of wheels, and a battery assembly operatively connected to the electric drive unit. The battery assembly including a housing having a plurality of side walls that collectively define an interior zone. A plurality of battery cells is arranged in the interior zone. A support assembly connected to the housing supports the plurality of battery cells. The support assembly includes a support plate, an external structural plate, and a channeled cooling plate arranged between the support plate and the external structural plate, and a plurality of channeled cooling plate inflation ports that extend through the support plate towards the channeled cooling plate. The plurality of channeled cooling plate inflation ports introduce an amount of fluid into the support assembly to expand one or more portions of the channeled cooling plate.

In addition to one or more of the features described herein a plurality of anchor members connect the channeled cooling plate to the support plate.

In addition to one or more of the features described herein the channeled cooling plate includes one or more selectively expandable inflation zones and one or more fixed zones.

In addition to one or more of the features described herein each of the one or more selectively expandable inflation zones are defined between two of the plurality of anchor members.

In addition to one or more of the features described herein at least one of the one or more selectively expandable inflation zones defines a cooling fluid passage.

In addition to one or more of the features described herein the at least one of the one or more selectively expandable inflation zones defining the cooling fluid passage includes a cooling fluid inlet and a cooling fluid outlet.

In addition to one or more of the features described herein the plurality of channeled cooling plate inflation ports define at least one of the cooling fluid inlet and the cooling fluid outlet.

In addition to one or more of the features described herein a plurality of anchor elements secure the external structural plate to the support plate.

In addition to one or more of the features described herein the external structural plate includes one or more selectively expandable inflation sections.

In addition to one or more of the features described herein a plurality of external structural plate inflation ports that extend through the external structural plate towards the channeled cooling plate, the plurality of external structural plate inflation ports introducing an amount of fluid between the external structural plate and the channeled cooling plate to expand one or more portions of the external structural plate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
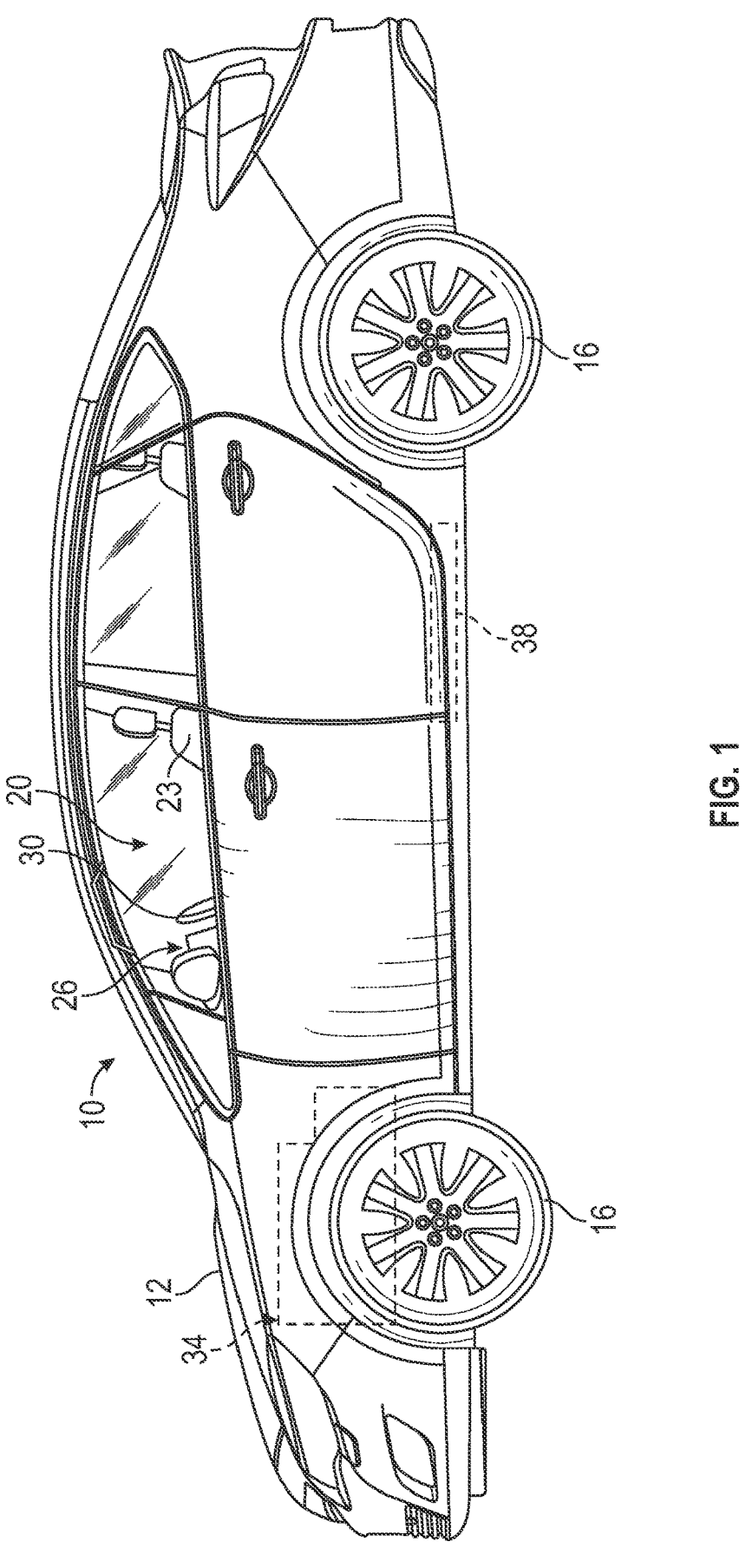
FIG. 1 is a left side view of a vehicle including a rechargeable energy storage system (RESS) having a heat exchange member including a battery cell support surface and an inflatable cooling system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control the orientation of select ones of the plurality of wheels 16. Vehicle 10 includes an electric drive unit 34 that provides power to one or more of the plurality of wheels 16.

Figure 2:
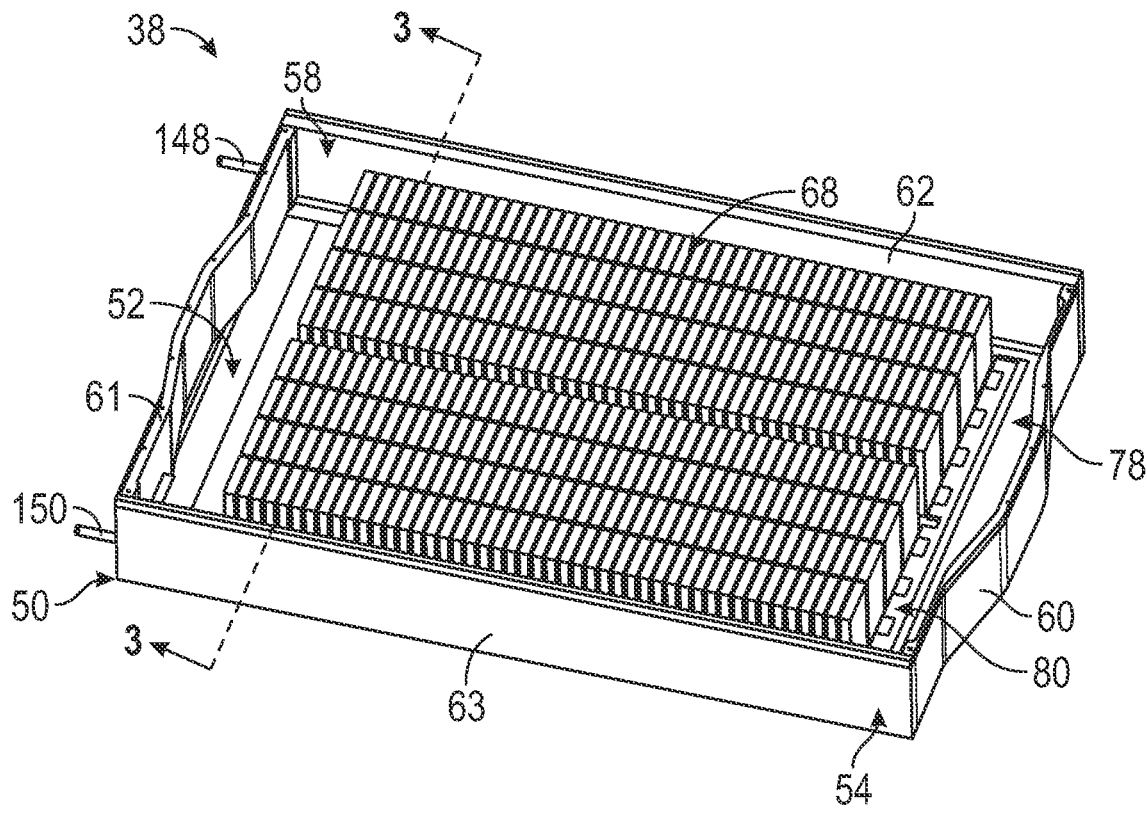
FIG. 2 is a partial perspective view of the RESS of FIG. 1, in accordance with a non-limiting example.

A rechargeable energy storage system (RESS) or battery assembly 38 is arranged in body 12 and provides power to electric drive unit 34. At this point, it should be understood that the location of electric drive unit 34 and battery assembly 38 may vary. As shown in FIG. 2, battery assembly 38 includes a housing 50 having a support assembly 52 and a plurality of side walls 54 that collectively define an interior zone 58. The plurality of side walls 54 include a first side wall 60, a second side wall 61, a third side wall 62, and a fourth side wall 63. Housing 50 also includes a cover (not shown).

Figures 3, 4:
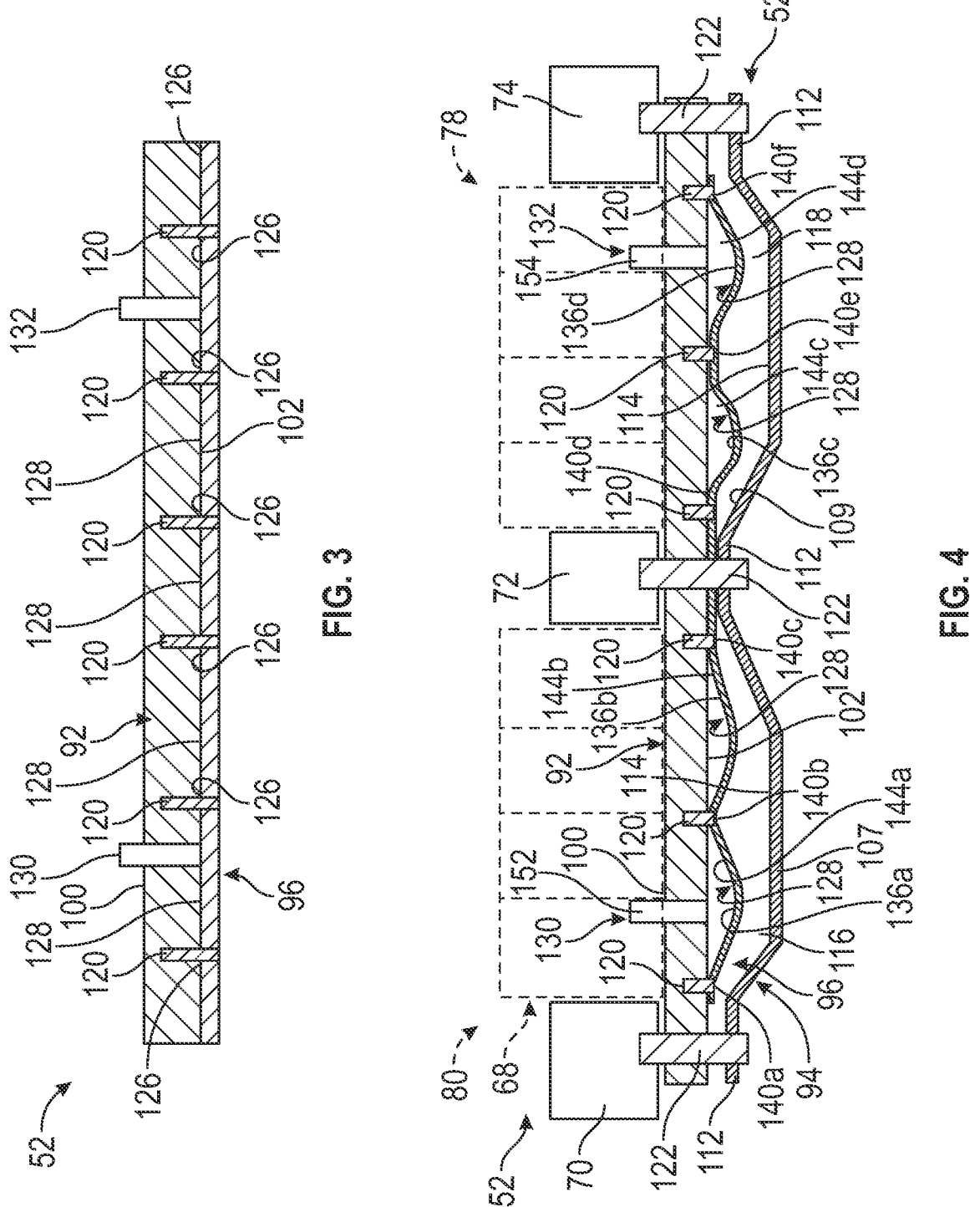
FIG. 3 is a sectional view of the battery cell support surface and inflatable cooling system prior to inflation taken through the line 3-3 in FIG. 2, in accordance with a non-limiting example.
FIG. 4 is a sectional view of the battery cell support surface and inflatable cooling system of FIG. 3 after inflation and installation of an external structural plate, in accordance with a non-limiting example.

A plurality of battery cells 68 is arranged in interior zone 58 of housing 50. Battery cells 68 rest upon support assembly 52 between a first cross bar 70, a second crossbar 72, and a third crossbar 74 as shown in FIG. 4. First crossbar, 70, second crossbar 72, and third crossbar 74 form two adjacent groupings 78 and 80 of battery cells 68. Crossbars 70, 72, and 74 may also serve as side walls of housing 50. In the non-limiting example shown, each grouping 78 and 80 includes four columns of forty-seven battery cells 68. At this point, it should be understood that the number of groupings, the number of columns in each grouping, the orientation of each grouping, and the number of battery cells in each column may vary. Further, while depicted as prismatic cells, battery cells 68 may take on various forms including pouch cells and cylindrical cells.

Referring to FIGS. 3 and 4 and with continued reference to FIG. 2, Support assembly 52 includes a support plate 92, an external structural plate 94, and a bubble or channeled cooling plate 96. Channeled cooling plate 96 is arranged between support plate 92 and external structural plate 94. Support plate 92 includes a first or battery cell support surface 100 and a second surface 102 that is opposite first surface 100. In a non-limiting example, support plate 92 may be formed from one of aluminum, such as 5xxx or 6xxx aluminum plate, magnesium, steel, and/or alloys thereof. As will be detailed herein, channeled cooling plate 96 is connected to support plate 92.

External structural plate 94 includes a first or outer surface portion 107 and a second surface portion 109 that is opposite first surface portion 107. External structural plate 94 serves as skid plate or as an outer protective plate for battery assembly 38 and may be formed from one of aluminum, such as 5xxx or 6xxx aluminum plate, magnesium, steel, and/or alloys thereof. External structural plate 94 may also be formed from composite materials. External structural plate 94 includes one or more first portions 112 that abut or nearly abut channeled cooling plate 96 and one or more second portions 114 that are spaced from channeled cooling plate 96 forming corresponding chambers 116 and 118.

Channeled cooling plate 96 is secured to support plate 92 through a plurality of anchor members 120. Anchor members 120 may define weld beads, tack welds, fasteners, adhesive, sealant, or the like. Similarly, external structural plate 94 is secure to support plate 92 through a plurality of anchor elements 122. Anchor elements 122 may take the form of bolts that extend through external structural plate 94, channeled cooling plate 96, and support plate 92 and connect with first crossbar 70, second crossbar 72, and third crossbar 74. Channeled cooling plate 96 includes one or more first sections 126 that abut or nearly abut second surface 102 of support plate 92, FIG. 3 and one or more second sections 128 that are not anchored to support plate 92, FIG. 4.

In a non-limiting example, support assembly 52 includes a first channeled cooling plate inflation port 130 and a second channeled cooling plate inflation port 132 arranged in support plate 92. First and second channeled cooling plate inflation ports 130 and 132 are mounted in second section 128 of channeled cooling plate 96. First channeled cooling plate inflation port 130 and second channeled cooling plate inflation port 132 deliver pressurized fluid between second surface 102 and channeled cooling plate 96 causing each second section 128 to expand as shown in FIG. 4. That is, each second section 128 of channeled cooling plate 96 defines a selectively expandable inflation zone 136a, 136b, 136c, and 136d at each second section 128. In a non-limiting example, selectively expandable inflation zone 136a, 136b, 136c, and 136d may be fluidically connected with one another creating a network of cooling zones. Each anchor member 120 creates a fixed zone 140a, 140b, 140c, 140d, 140e, and 140f of channeled cooling plate 96 at each first section 126. Fixed zones 140a-140f are anchored to channeled cooling plate 96 while selectively expandable inflation zones 136a-136d form corresponding fluidically interconnected cooling fluid passages 144a, 144b, 144c, and 144d that guide a cooling fluid in a heat exchange relationship with second surface 103 of channeled cooling plate 96.

In a non-limiting example, support assembly 52 includes a cooling fluid supply inlet 148 and a cooling fluid supply outlet 150 (FIG. 2) that are fluidically connected to cooling fluid passages 144a-144d. In a non-limiting example, first channeled cooling plate inflation port 130 and second channeled cooling plate inflation port 132 may be removed after inflating channeled cooling plate 96. In another non-limiting example, first channeled cooling plate inflation port 130 and second channeled cooling plate inflation port 132 may connect with cooling fluid supply inlet 148 and cooling fluid supply outlet 150 so as to define a cooling fluid inlet 152 and a cooling fluid outlet 154. With this arrangement, cooling fluid may be circulated through battery assembly 38 below support plate 92. By inflating channeled cooling plate 96 to form cooling passages, support assembly 52 is not only easier to manufacture but, with the addition of external structural plate 94, is protected from external loading such as may occur when vehicle 10 hits potholes or drives over various road debris.

Figures 5, 6:
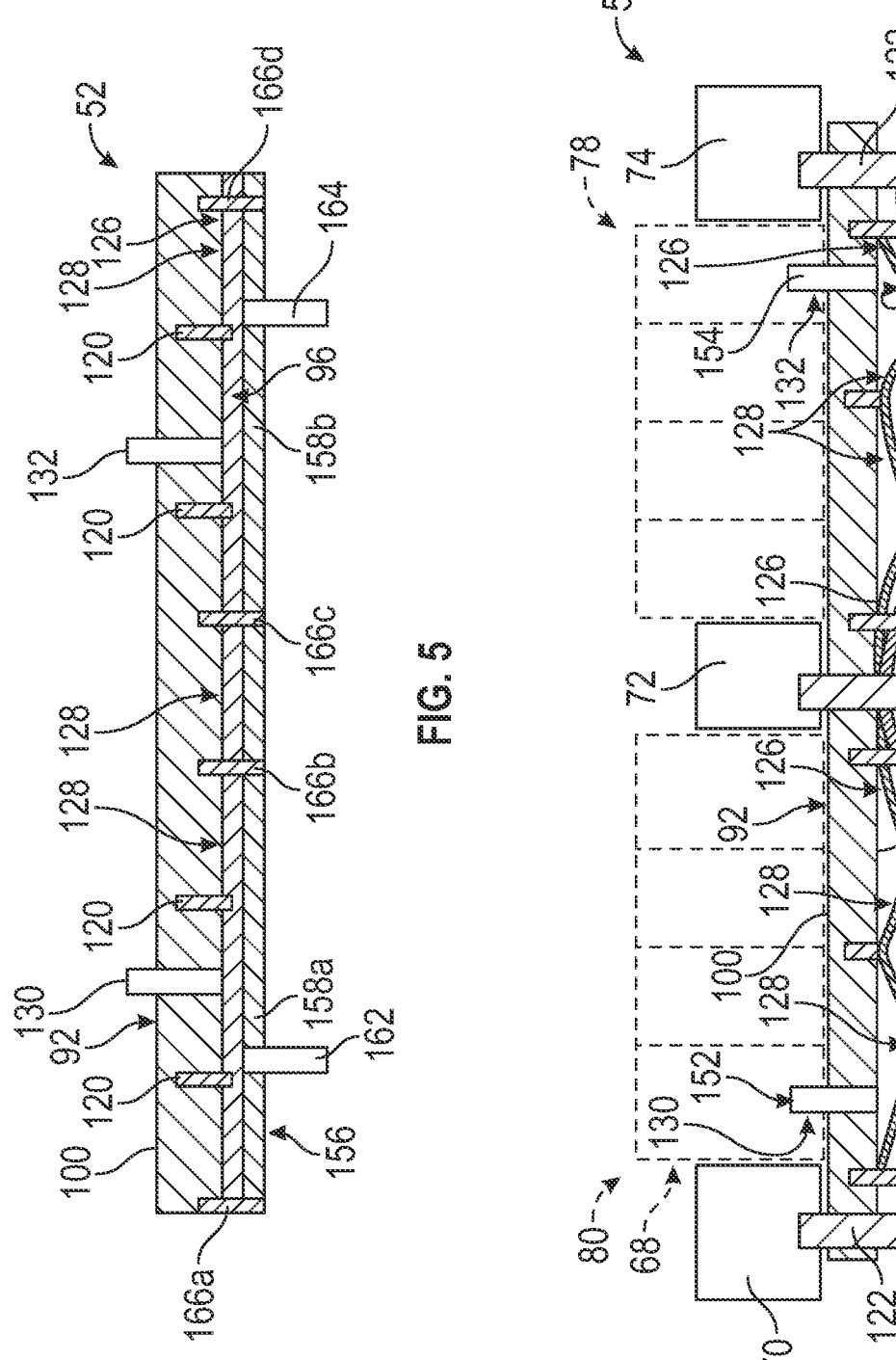
FIG. 5 is a sectional is a plan view of the battery cell support surface, inflatable cooling system, and inflatable external structural plate prior to inflation, in accordance with another non-limiting example.
FIG. 6 is a sectional view of the battery cell support surface, inflatable cooling system, and inflatable external structural plate of FIG. 5 after inflation, in accordance with a non-limiting example.

In another non-limiting example shown in FIGS. 5 and 6, support assembly 52 may include an external structural support plate 156 having a first selectively expandable inflation section 158a and a second selectively expandable inflation section 158b. That is, in place of a fixed external structural support plate 94 as shown in FIGS. 3 and 5, external structural support plate 156 may be expanded. In a non-limiting example, in addition to first channeled cooling plate inflation port 130 and second inflation port 132 provided in support plate 92, support assembly 52 includes a first external structural plate inflation port 162 and a second external structural plate inflation port 164 (FIG. 6) provided in external structural plate 156. The number and location of external structural inflation ports may vary.

In a non-limiting example, external structural plate 156 is secured to support plate 92 through a plurality of anchor components 166a, 166b, 166c, and 166d. First selectively expandable inflation section 158a is defined between anchor component 166a and 166b and second selectively expandable inflation section 158b is defined between anchor component 166b and anchor component 166c. First external structural plate inflation port 162 and second external structural plate inflation port 164 deliver pressurized fluid between external structural plate 156 and channeled cooling plate 96 causing first selectively expandable inflation section 158a and second selectively expandable inflation section 158b to expand.

The expansion of first selectively expandable inflation section 158a and second selectively expandable inflation section 158b accommodate the expansion of selectively expandable inflation zones 136 of channeled cooling plate 96. By inflating first selectively expandable inflation section 158a and second selectively expandable inflation section 158b, support assembly 52 is easier and less expensive to manufacture. That is, there would be no need to purchase pre-formed external structural support plates.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery assembly comprising:
a housing including a plurality of side walls that collectively define an interior zone;
a plurality of battery cells arranged in the interior zone; and
a support assembly connected to the housing supporting the plurality of battery cells, the support assembly including a support plate, an external structural plate, and a channeled cooling plate arranged between the support plate and the external structural plate, and a plurality of channeled cooling plate inflation ports that extend through the support plate towards the channeled cooling plate, the plurality of channeled cooling plate inflation ports introducing an amount of fluid into the support assembly to expand one or more portions of the channeled cooling plate.

2. The battery assembly according to claim 1, further comprising a plurality of anchor members connecting the channeled cooling plate to the support plate.

3. The battery assembly according to claim 2, wherein the channeled cooling plate includes one or more selectively expandable inflation zones and one or more fixed zones.

4. The battery assembly according to claim 3, wherein each of the one or more selectively expandable inflation zones are defined between two of the plurality of anchor members.

5. The battery assembly according to claim 3, wherein at least one of the one or more selectively expandable inflation zones defines a cooling fluid passage.

6. The battery assembly according to claim 5, wherein the at least one of the one or more selectively expandable inflation zones defining the cooling fluid passage includes a cooling fluid inlet and a cooling fluid outlet.

7. The battery assembly according to claim 6, wherein the plurality of channeled cooling plate inflation ports define at least one of the cooling fluid inlet and the cooling fluid outlet.

8. The battery assembly according to claim 3, further comprising a plurality of anchor elements securing the external structural plate to the support plate.

9. The battery assembly according to claim 3, wherein the external structural plate includes one or more selectively expandable inflation sections.

10. The battery assembly according to claim 9, further comprising a plurality of external structural plate inflation ports that extend through the external structural plate towards the channeled cooling plate, the plurality of external structural plate inflation ports introducing an amount of fluid between the external structural plate and the channeled cooling plate to expand one or more portions of the external structural plate.

11. A vehicle comprising:

a body including a passenger compartment;

a plurality of wheels;

an electric drive unit supported by the body and operatively connected to one or more of the plurality of wheels; and a battery assembly operatively connected to the electric drive unit, the battery assembly comprising:

a housing including a plurality of side walls that collectively define an interior zone;

a plurality of battery cells arranged in the interior zone; and a support assembly connected to the housing supporting the plurality of battery cells, the support assembly including a support plate, an external structural plate, and a channeled cooling plate arranged between the support plate and the external structural plate, and a plurality of channeled cooling plate inflation ports that extend through the support plate towards the channeled cooling plate, the plurality of channeled cooling plate inflation ports introducing fluid into the support assembly to expand one or more portions of the channeled cooling plate.

12. The vehicle according to claim 11, further comprising a plurality of anchor members connecting the channeled cooling plate to the support plate.

13. The vehicle according to claim 12, wherein the channeled cooling plate includes one or more selectively expandable inflation zones and one or more fixed zones.

14. The vehicle according to claim 13, wherein each of the one or more selectively expandable inflation zones are defined between two of the plurality of anchor members.

15. The vehicle according to claim 13, wherein at least one of the one or more selectively expandable inflation zones defines a cooling fluid passage.

16. The vehicle according to claim 15, wherein the at least one of the one or more selectively expandable inflation zones defining the cooling fluid passage includes a cooling fluid inlet and a cooling fluid outlet.

17. The vehicle according to claim 16, wherein the plurality of channeled cooling plate inflation ports define at least one of the cooling fluid inlet and the cooling fluid outlet.

18. The vehicle according to claim 13, further comprising a plurality of anchor elements securing the external structural plate to the support plate.

19. The vehicle according to claim 13, wherein the external structural plate includes one or more selectively expandable inflation sections.

20. The vehicle according to claim 19, further comprising a plurality of external structural plate inflation ports that extend through the external structural plate towards the channeled cooling plate, the plurality of external structural plate inflation ports introducing an amount of fluid between the external structural plate and the channeled cooling plate to expand one or more portions of the external structural plate.

* * * * *